G. H. GIBSON.
LIQUID FLOW MEASURING APPARATUS.
APPLICATION FILED FEB. 5, 1913.

1,196,735.

Patented Aug. 29, 1916.
2 SHEETS—SHEET 1.

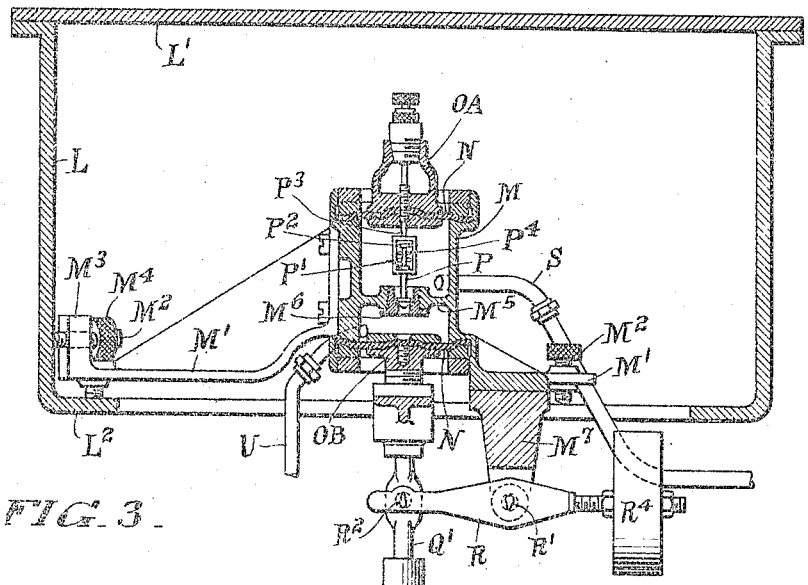
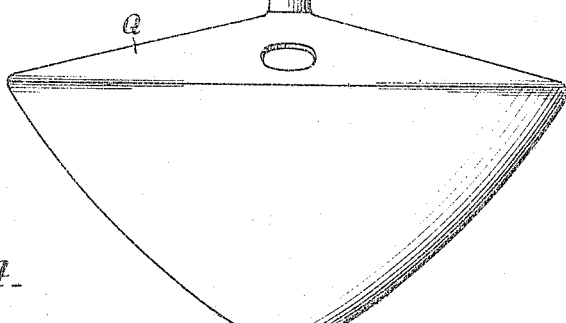
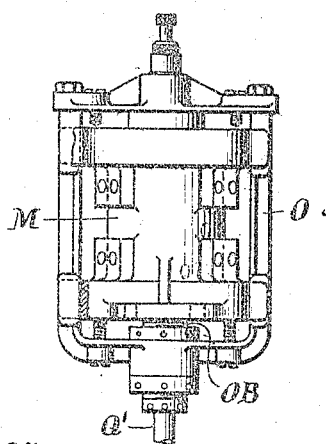
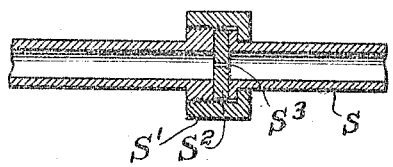

UNITED STATES PATENT OFFICE.

GEORGE H. GIBSON, OF MONTCLAIR, NEW JERSEY, ASSIGNOR TO JOSEPH S. LOVERING WHARTON, WILLIAM S. HALLOWELL, AND JOHN C. JONES, ALL OF PHILADELPHIA, PENNSYLVANIA, TRADING IN SAID PHILADELPHIA AS HARRISON SAFETY BOILER WORKS.

LIQUID-FLOW-MEASURING APPARATUS.

1,196,735.  Specification of Letters Patent.  Patented Aug. 29, 1916.

Original application filed January 12, 1912, Serial No. 670,862. Divided and this application filed February 5, 1913. Serial No. 746,280.

*To all whom it may concern:*

Be it known that I, GEORGE H. GIBSON, a citizen of the United States of America, residing in Montclair, in the county of Essex and State of New Jersey, have invented certain new and useful Improvements in Liquid-Flow-Measuring Apparatus, of which the following is a true and exact description, reference being had to the accompanying drawings, which form a part thereof.

My present invention relates to liquid measuring apparatus of the kind in which the liquid to be measured is caused to flow over a weir.

The object of the present invention is to provide improved means, simple in construction and reliable in operation, by which the amount of liquid flowing is determined from the varying accumulation of liquid on the supply side of the weir, which varies in a known manner as the flow over the weir increases and diminishes.

The various features of novelty which characterize my invention are pointed out with particularity in the claims annexed to and forming a part of this specification.

For a better understanding of the invention, however, and the advantages possessed by it, reference should be had to the accompanying drawings and descriptive matter in which I have illustrated and described one form in which my invention may be embodied.

Figure 2:
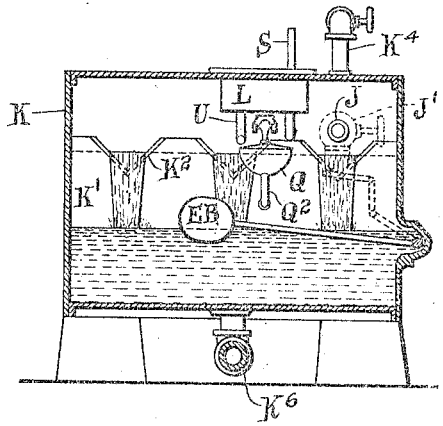
Figure 1:
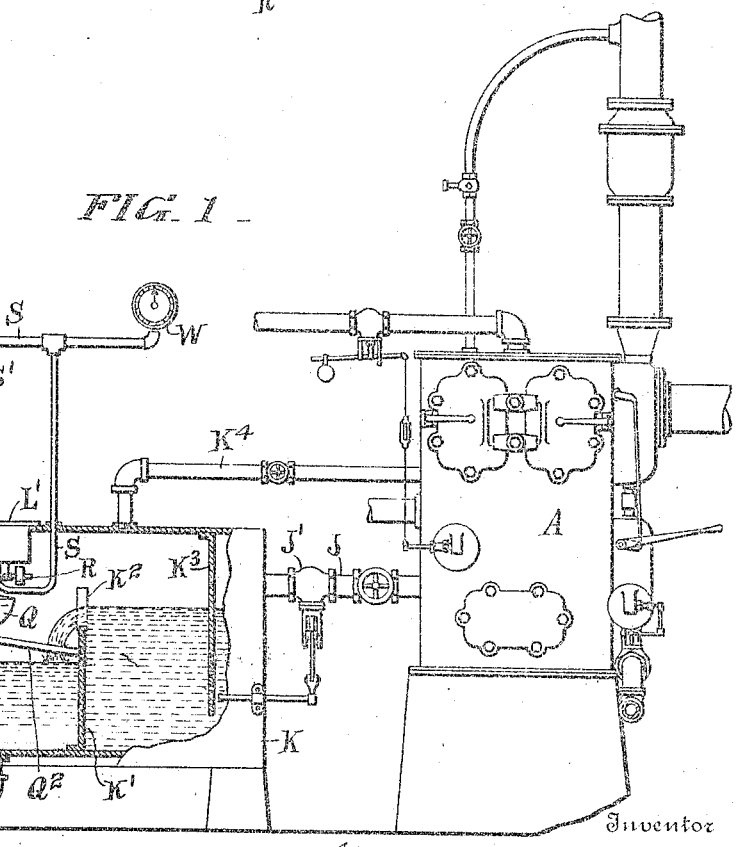

Of the drawings: Figure 1 is an elevation, partly broken away and in section, of a combined water heating and measuring apparatus. Fig. 2 is a sectional elevation on the line 2—2 of Fig. 1. Fig. 3 is a sectional elevation taken on the line 3—3 of Fig. 1. Fig. 4 is an elevation of a portion of the bucket weighing mechanism employed; and Fig. 5 is a sectional elevation of a portion of the pressure fluid supply piping employed.

In the particular form of apparatus with which my present invention is used, which is shown by the drawings, A represents an open feed water heater of well known type. The discharge pipe J from the heater A leads to a closed weir chamber K, opening to the latter on the supply side of the weir K′ located within the weir chamber. As shown, the weir K′ is formed with a plurality of V-shaped notches or orifices $K^2$ in its upper edge, the apices of these orifices being all at the same level.

$K^3$ represents a baffle arranged in the weir chamber between the mouth of the pipe J and the weir $K^2$ and advantageously perforated as shown in its lower portion. The purpose of the baffle $K^3$ is to insure a quiet flow of water to the weir proper and an avoidance of eddy currents in the water on the supply side of the weir. The flow of water from the heater tank into the weir chamber is controlled by a valve J′ located in the pipe J and operated by the float EB located within the weir chamber on the discharge side of the weir.

$K^4$ represents a pipe, opening to the weir chamber at the top of the latter, and to the heater above the water level therein. This pipe is employed to equalize the vapor pressure in the weir chamber and heater.

$K^6$ represents the service discharge pipe leading from the outlet compartment of the weir chamber, and through which the heated and measured water is delivered for use to a boiler feed pump, laundry tubs or the like.

The combined water heating and weir measuring apparatus shown possesses certain features of novelty independent of the character of the particular means employed for determining the amount of liquid flowing over the weir, and these features are claimed in my prior Patent No. 1,096,621, granted May 12, 1914, wherein this apparatus is described and illustrated in greater detail.

In the present case, which is a division of said prior patent, the invention claimed pertains particularly to the means employed for determining the amount of liquid flowing over the weir.

With weir measuring apparatus of the character described it is well known that the rate of flow over the weir is a function of the height of water level on the supply side of the weir. Where the weir is formed with a V-shaped orifice or orifices, such as the orifices $K^2$, the flow is proportional to the five-halves power of the height of water level on the supply side of the weir above the level of the weir notch apex or apices, *i. e.* if ($h$) represents the height, the quantity rate of flow, (q) of liquid over the weir is given by the equation $$q = ah^{5/2},$$

where (a) is a constant.

With the apparatus disclosed herein I measure the flow of water over the weir by means of a bucket Q suspended in the weir chamber on the discharge side of the weir with the bottom of the cavity in the bucket located at the level of the weir notch apices. The interior of the bucket Q is connected to the supply side of the weir below the level of the weir notch apices by a flexible pipe $Q^2$ which may be formed of rubber hose. With this arrangement it is obvious that the bucket will be filled with water at all times to the level of the water on the supply side of the weir, and those skilled in the art will understand that the weight of the bucket and its contents will be a function of the rate of flow over the weir. Preferably I shape the interior surface of the bucket so that the weight of the water contained by it will bear a constant ratio to the rate of flow over the weir as the height of water level on the supply side of the weir rises and falls. Those skilled in the art will have no difficulty in determining the shape to be given to the inner surface of the bucket Q in order to obtain the desired proportional readings when the law governing the flow over the particular weir with which the bucket is to be used is determined, as it may be, both theoretically and experimentally, by methods well known to those skilled in the art.

In the apparatus disclosed fluid pressure means are employed for measuring the varying weight of the water contained in the bucket Q. This fluid pressure measuring apparatus comprises a vertical cylinder M having its ends closed by flexible diaphragms N formed of sheet metal or other suitable material. The diaphragms N are connected at their centers to the heads OA and OB of a vertically movable yoke member O which surrounds the cylinder M and is connected to and supports the stem Q′ of the bucket Q. The cylinder M is provided with supporting arms M′ carrying vertical adjusting screws $M^2$ at their outer ends. These screws rest on the inturned flange $L^2$ of a supporting member L which is secured to the top wall of the weir chamber and is normally closed at its upper end by the cover plate L′. One of the arms M′ is provided with an upturned portion $M^3$ receiving the horizontal adjustable screw $M^4$ adapted to be forced against the cylindrical wall of the member L to thereby force the outer end of the other arms M′ against the cylindrical wall of the member L and thus rigidly fix the cylinder M in any desired adjustment with respect to the cylinder L. The cylinder M is interiorly divided into upper and lower compartments by a diaphragm or partition $M^5$ formed with a centrally threaded aperture receiving a valve seat member $M^6$. The port through the latter connecting the upper and lower cylinder compartments is controlled by a valve P operative to open and close the port in the member $M^6$ on slight up and down movements respectively of the yoke member O and bucket Q. As shown, the stem of the valve P passes through a yoke member $P^2$ located within the upper compartment of the cylinder M and having a stem $P^3$ adjustably connected to the yoke O. The stem of the valve P is provided with a collar P′ normally pressed against the bottom of the yoke $P^2$ by the spring $P^4$, the latter yielding, however, to limit the maximum pressure with which the valve P may be forced against its seat.

R represents a counter-balancing lever pivotally connected by the knife edge pivot R′ to a bracket $M^7$ carried by the cylinder M, and pivotally connected by the knife-edge pivot $R^2$ to the stem Q′ of the bucket Q. The lever R carries an adjustable counter-weight $R^4$. Preferably, the lever R and counter-weight $R^4$ are adjusted to exactly balance the weight of the bucket Q and parts moving with the latter, when the bucket is empty, so that the pressure maintained in the upper compartment of the cylinder M, as hereinafter described, may be directly proportional to the weight of the water held in the bucket Q and hence may be directly proportional to the flow over the weir. The balancing pressure fluid is supplied to the upper compartment of the cylinder M through the pipe S leading from a suitable source of pressure fluid as for instance the tank T containing compressed air which may be furnished by any suitable compressing device, not shown. The pipe S contains a section S′ in which there is located a diaphragm $S^2$ formed with an orifice $S^3$ so restricted that the pressure in the pipe S on the outlet side of the diaphragm $S^2$ will depend upon the leakage from the pipe S and will be practically independent of the pressure on the supply side of the diaphragm. The lower compartment of the cylinder M is connected to the external atmosphere by the exhaust pipe U. Preferably portions of the pipes U and S within the weir chamber are made flexible to facilitate the adjustment of the cylinder M with respect to the support L. For instance, these pipe portions may be lead.

In operation the compressed air or other pressure fluid is constantly but slowly supplied to the upper end of the cylinder M by the pipe S. When the pressure in the upper compartment of the cylinder M becomes higher than is required to balance the weight of water contained by the bucket Q, the consequent elevation of the yoke O, diaphragms N and valve P, lifts the latter off its seat, thus permitting the pressure fluid to escape from the upper compartment of the cylinder with a consequent reduction in pressure therein. Normally the valve P is "cracked" so that a restricted but constant discharge through the port controlled by the valve takes place. When the pressure in the upper compartment of the cylinder M becomes insufficient to balance the weight of the water in the bucket Q the more or less complete closure of the valve P quickly results in building the pressure in the upper compartment up to the proper value.

Inasmuch as the pressure in the upper compartment of the cylinder M and the portion of the pipe S between it and the section S' is proportional to the quantity of water flowing over the weir, an ordinary pressure gage, suitably graduated, may be employed to give direct readings of the rate of flow in suitable quantity units. In the drawings, such a gage is indicated at W. The varying pressure in the conduit system on the outlet side of the section S may be employed to actuate suitable recording and registering mechanism. I have not thought it necessary to illustrate and describe such recording and registering mechanism herein as they form no part of my present invention. Moreover, examples of such mechanism are disclosed in my prior application Serial No. 670,863, filed January 12th, 1912. The last mentioned application also contains claims to certain features of the construction and arrangement of the measuring apparatus proper disclosed but not claimed herein.

While in accordance with the provisions of the statutes I have illustrated and described the best form of my invention now known to me, it will be apparent to those skilled in the art that changes may be made in the form of the apparatus disclosed without departing from the spirit of my invention and that under some conditions certain features of my invention may be used with advantage without a corresponding use of other features.

Having now described my invention, what I claim as new and desire to secure by Letters Patent, is:

1. In flow measuring apparatus the combination of a weir over which the liquid to be measured flows, a substantially stationary receptacle, provisions for maintaining liquid therein to the height of the liquid level on the supply side of the weir, said receptacle being so shaped with respect to the law of flow over the weir that the weight of the liquid contained by the receptacle bears a constant ratio to the varying rate of flow over the weir, and means for measuring the varying weight of the liquid in said receptacle.

2. In a liquid flow measuring apparatus, the combination with a weir over which the liquid to be measured flows, of a weighing mechanism, a receptacle supported thereby, means connecting the interior of said receptacle to the supply side of the weir while permitting the receptacle to move relative to the weir, said receptacle being so shaped and arranged that the varying weight of said receptacle and the liquid therein, as the liquid level therein varies to correspond to variations in the height of liquid level on the supply side of the weir, will be in linear proportion to the rate of flow over the weir.

3. In flow measuring apparatus the combination of a weir chamber and a weir therein over which the liquid to be measured flows, a receptacle open to the supply side of the weir at or below the lowermost level of overflow over the weir, receptacle supporting means including provisions actuated by slight movements of said receptacle for exerting the variable force required to sustain said receptacle in a substantially stationary position as the weight of the liquid within the receptacle varies with variations in the height of liquid level on the supply side of the weir.

4. In flow measuring apparatus the combination of a closed weir chamber and a weir therein over which the liquid to be measured flows, a receptacle located in said chamber and open to the supply side of the weir at or below the lowermost level of overflow over the weir, receptacle supporting means located within the weir chamber and including provisions actuated by slight movements of said receptacle for exerting the variable force required to sustain said receptacle in a substantially stationary position as the weight of the liquid within the receptacle varies with variations in the height of liquid level on the supply side of the weir, and means without said chamber for measuring said variable force.

5. In flow measuring apparatus the combination of a closed weir chamber and a weir therein over which the liquid to be measured flows, a receptacle located in said chamber and open to the supply side of the weir at or below the lowermost level of overflow over the weir, receptacle supporting means located within the weir chamber and including fluid pressure provisions actuated by slight movements of said receptacle for exerting the variable force required to sustain said receptacle in a substantially stationary position as the weight of the liquid within the receptacle varies with variations in the height of liquid level on the supply side of the weir, and means without said chamber for measuring said variable force.

6. In flow measuring apparatus the combination of a closed weir chamber and a weir therein over which the liquid to be measured flows, a receptacle located in said chamber, and open to the supply side of the weir at or below the lowermost level of overflow over the weir, a receptacle supporting means located within the weir chamber and including fluid pressure provisions independent of the pressure in said chamber and actuated by slight movements of said receptacle for exerting the variable force required to sustain said receptacle in a substantially stationary position as the weight of the liquid within the receptacle varies with variations in the height of liquid level on the supply side of the weir, and means without said chamber for measuring said variable force.

7. In flow measuring apparatus the combination of a closed weir chamber and a weir therein over which the liquid to be measured flows, a receptacle located in said chamber, and provisions for maintaining liquid therein to the level of the liquid on the supply side of the weir, said receptacle being so formed with respect to the law of flow over the weir that the weight of liquid contained by the receptacle bears a constant ratio to the rate of flow as the latter varies, and receptacle supporting means located within the weir chamber and including provisions actuated by slight movements of said receptacle for exerting the variable force required to sustain said receptacle as the weight of the liquid within the receptacle varies.

8. In a device for measuring the flow of liquid, a weir box, a movable liquid container, a connection between said container and box whereby the liquid in said box may flow into said container, said container being so formed as to receive a weight of the liquid therein proportionate to the rate of flow over the weir notch, there being communication between said container and said weir box above the highest level of said liquid, and devices connected to said liquid container by which the flow of said liquid may be determined.

9. A flow meter for liquids comprising a weir, a vessel in communication with the liquid above said weir, and shaped to receive an amount of liquid corresponding to the liquid flow over said weir, means for counterbalancing the weight of said vessel and its contents, and means coöperating with said counterbalancing means to give an indication of such flow.

GEORGE H. GIBSON.

Witnesses:
 JOHN H. SHERMAN,
 ROBERT G. CLIFTON.